United States Patent
Dong et al.

(10) Patent No.: US 12,436,012 B2
(45) Date of Patent: Oct. 7, 2025

(54) METHOD FOR MEASURING FLOW VELOCITY DISTRIBUTION OF GROUNDWATER USING DISTRIBUTED OPTICAL FIBER WITH ACTIVE HEATING

(71) Applicant: Institute of Geology and Geophysics, Chinese Academy of Sciences, Beijing (CN)

(72) Inventors: Yanhui Dong, Beijing (CN); Liheng Wang, Beijing (CN); Huaqing Qin, Beijing (CN)

( * ) Notice: Subject to any disclaimer, the term of this patent is extended or adjusted under 35 U.S.C. 154(b) by 0 days.

(21) Appl. No.: 19/185,708

(22) Filed: Apr. 22, 2025

(65) Prior Publication Data

US 2025/0251266 A1    Aug. 7, 2025

(30) Foreign Application Priority Data

Apr. 26, 2024   (CN) .......................... 202410516575.2

(51) Int. Cl.
| | | |
|---|---|---|
| *G01F 1/688* | (2006.01) | |
| *E02D 1/02* | (2006.01) | |
| *G01F 1/696* | (2006.01) | |
| *G01P 5/10* | (2006.01) | |

(52) U.S. Cl.
CPC ........... *G01F 1/6884* (2013.01); *E02D 1/027* (2013.01); *G01F 1/696* (2013.01); *G01P 5/10* (2013.01)

(58) Field of Classification Search
CPC ....... G01F 1/6884; G01F 1/696; E02D 1/027; G01P 5/10
See application file for complete search history.

(56) References Cited

U.S. PATENT DOCUMENTS

| | | | | |
|---|---|---|---|---|
| 2007/0158064 A1* | 7/2007 | Pribnow | ............... | E21B 47/103 166/250.01 |
| 2007/0213963 A1* | 9/2007 | Jalali | ......................... | G01F 1/74 703/10 |
| 2014/0290335 A1* | 10/2014 | Shanks | .................... | G01F 25/10 73/25.05 |

FOREIGN PATENT DOCUMENTS

| | | | | | |
|---|---|---|---|---|---|
| CN | 110658123 A | * | 1/2020 | ............. | G01N 25/56 |
| CN | 115371766 A | * | 11/2022 | ............. | G01F 23/22 |

* cited by examiner

*Primary Examiner* — Peter J Macchiarolo
*Assistant Examiner* — Janice M Soto
(74) *Attorney, Agent, or Firm* — Addison D. Ault; IPGentleman Intellectual Property Services, LLC (57) ABSTRACT

The present disclosure provides a method for measuring flow velocity distribution of groundwater using distributed optical fiber with active heating, comprising: setting and optimizing field test parameters; conducting a background temperature monitoring test; performing a line-source active heating distributed temperature measurement test, including conducting multiple rounds of heating tests; denoising the obtained thermal plume attenuation signal data of the groundwater; and fitting the groundwater velocity-depth curve in the borehole by monitoring and analyzing the temperature difference signal between the internal temperature and the external temperature of the composite heating optical cable in a single depth section of the borehole, thereby obtaining a distributed groundwater velocity data set. The method of the present disclosure solves the problem that the existing groundwater flow velocity measurement technology cannot simultaneously conduct continuous and distributed measurements, improves the efficiency of groundwater velocity measurement, and it can avoid groundwater contamination during the measurement process.

10 Claims, 5 Drawing Sheets

METHOD FOR MEASURING FLOW VELOCITY DISTRIBUTION OF GROUNDWATER USING DISTRIBUTED OPTICAL FIBER WITH ACTIVE HEATING

CROSS-REFERENCE TO RELATED APPLICATION

This application claims the benefit of Chinese Patent Application No. CN202410516575.2 filed on Apr. 26, 2024 in China National Intellectual Property Administration, the whole disclosure of which is incorporated herein by reference.

TECHNICAL FIELD

The present disclosure relates to the field of geophysical technology, and relates to the field of "exploration or detection equipments or methods", specifically, to the "existence or measurement of flow velocity of groundwater" in "other or comprehensive exploration or detection", and especially to a method for measuring flow velocity distribution of groundwater using distributed optical fiber with active heating.

BACKGROUND

The flow rate and seepage velocity of groundwater are not only the key parameters for the rational development and pollution prevention of groundwater resources, but also the scientific basis for underground engineering construction and underground mineral resource exploitation. Therefore, how to accurately obtain these parameters has become a hot topic in the field of hydrogeological research.

The flow rate of groundwater is positively correlated with the flow velocity. At present, the flow velocity and flow direction test methods of groundwater are mainly divided into the following categories:

I. Point source tracer dilution method. This method injects tracers such as isotopes, fluorescent agents, sodium salts or deionized water into the borehole packer, observes the dilution process of the tracers in the groundwater, and thus detects the groundwater flow velocity.

II. Flowmeter. For example, electromagnetic flowmeters use the principle of electromagnetic induction to measure the flow rate of conductive fluid according to the electromotive force induced when the conductive fluid passes through an external magnetic field; rotor or impeller flowmeters place the rotor or impeller in the groundwater to be measured, and it rotates under the impact of groundwater flow, and the speed of the rotor or impeller rotation reflects the flow rate.

III. Optical method. For example, the colloidal borescope flowmeter takes pictures of the movement characteristics of colloid particles in groundwater to calculate the groundwater flow velocity and direction.

The above method has the following problems and disadvantages:

I. The above methods require the detection device/probe to be placed in the wellbore, and it can only detect the groundwater flow velocity at a certain point at a time. If it is necessary to detect the groundwater flow velocity at different depths or layers, it is necessary to raise or lower the probe to the target layer. Therefore, the temporal and spatial continuity of the measured data is poor, and the groundwater is greatly disturbed during the detection process, which increases the error of the measurement results.

II. As the methods in the prior art cannot measure distributed measurements simultaneously and continuously, when measuring the groundwater flow velocity in a certain layer, it often requires to isolate the target layer of the wellbore. However, the cost of isolation test equipment is very high, and there is an impact of wellbore damage on groundwater flow velocity detection.

III. The tracer dilution method involves the introduction of substances that are not originally part of the groundwater, into the aquifer, which may cause environmental pollution.

SUMMARY

The object of the present disclosure is to at least partially overcome the defects of the prior art and provide a method for measuring flow velocity distribution of groundwater by using distributed optical fiber with active heating.

The present disclosure also aims to provide a method for measuring flow velocity distribution of groundwater by using distributed optical fiber with active heating, to solve the problem that existing groundwater flow velocity measurement technology cannot simultaneously conduct continuous and distributed measurements.

The present disclosure also aims to provide a method for measuring flow velocity distribution of groundwater by using distributed optical fiber with active heating, to improve the efficiency of groundwater flow velocity measurement.

The present disclosure also aims to provide a method for measuring flow velocity distribution of groundwater by using distributed optical fiber with active heating, to avoid contamination of groundwater during the measurement process.

To achieve the above purposes or one of the purposes, the technical solution of the present disclosure is as follows:

A method for measuring flow velocity distribution of groundwater using distributed optical fiber with active heating, comprising:

Step S1: Setting and optimizing field test parameters;

Step S2: Conducting a background temperature monitoring test, comprising performing multiple rounds of temperature measurement tests; monitoring background temperature of a borehole along depth profile in each round of temperature measurement tests, with a monitoring time of more than 24 hours; and performing a quality check on the temperature measurement test data after each round of temperature measurement tests;

S2.1 DTS parameter optimization;

S2.1.1 Test circuit design and on-site equipment testing;

S2.1.2 DTS optical fiber on-site layout and testing; repeat the DTS parameter setting and optimization of S1.2, check and debug optical fiber temperature measurement accuracy and parameters, calibrate DTS temperature measurement system, including the calibration of the length of the optical fiber to be monitored underground, the calibration of the surface temperature calibration length, and the calibration of the position of the underground temperature probe;

S2.2 Formal background temperature measurement test;

S2.2.1 The first round of temperature measurement test: Start DTS to monitor the borehole background temperature-depth profile; the monitoring time is more than 24 hours;

S2.2.2 Perform Data quality check of the first round of temperature measurement test to ensure data integrity and quality;

S2.2.3 Repeat steps S2.2.1 and S2.2.2 to perform background temperature measurement 2-3 times to grasp the overall temperature change characteristics;

S2.3 Post-experiment processing and data integration analysis;

S2.3.1 Calibration of temperature data between downhole temperature measuring unit and surface temperature measuring unit: calibrate all collected temperature data to ensure that the temperature measurement results at different depths and locations are coordinated with each other;

S2.3.2 Wellbore temperature-depth monitoring profile analysis: integrate and analyze all monitoring data, to produce a temperature-depth profile diagram, and provide basic data for subsequent active heating tests;

Step S3: Performing a line-source active heating distributed temperature measurement test, comprising performing multiple rounds of heating tests; in each round of heating tests, controlling a heating device controller to turn on composite heating optical cable for a predetermined time, so that the temperature of groundwater monitoring line rises to a predetermined temperature value, then stopping heating; and stopping monitoring when the temperature of the groundwater monitoring line returns to the background temperature; and performing a quality check on the temperature measurement test data after each round of heating tests;

S3.1 Preliminary test

S3.1.1 Repeat the steps in S2.1 to design the test circuit and conduct on-site equipment testing, including circuit connection debugging, power test of power supply equipment, on-site layout and testing of DTS optical fiber, including calibration of the length of the optical fiber to be monitored underground, calibration of the length of the surface temperature calibration, calibration of the position of the underground temperature calibration unit, inspection and debugging of the optical fiber temperature measurement accuracy and parameters, and calibration of the DTS temperature measurement system;

S3.1.2 Downhole line heating maximum heating power test, maximum heating temperature test, optimization and adjustment of heating parameter settings;

S3.2 Formal temperature measurement test;

S3.2.1 Background temperature monitoring, turn on DTS to start monitoring, and select the background monitoring duration according to the background temperature measurement results in S2.3;

S3.2.2 First round of heating test: Turn on the intelligent controller of the heating device, and according to the results of S3.1.2, turn on the heating cable for a suitable time to make the temperature of the groundwater monitoring line rise by a certain degree, then turn off the heating cable and stop DTS monitoring when the temperature of the monitoring line returns to the background temperature;

S3.2.3 Data quality check of DTS temperature measurement data in the first round of temperature measurement test;

S3.2.4 Repeat S3.2.1, S3.2.2 and S3.2.3 and complete 2-3 heating tests;

S3.3 Post-experiment processing and data integration analysis;

S3.3.1 Calibration of temperature data of downhole temperature measuring unit and surface temperature measuring unit: compare the data collected by the downhole temperature measuring unit and surface temperature measuring unit with standard temperature data, adjust the deviation, and ensure that all temperature measurement data meet high accuracy and high reliability standards;

S3.3.2 Analysis of downhole temperature-depth profiles during the heating and cooling phases: analyze temperature data during the heating phase, focusing on changes in temperature with depth, and the speed and intensity of groundwater response to heating in boreholes of different depths;

Step S4: Denoising thermal plume attenuation signal data of the groundwater obtained in Step 3;

S4.1 Original signal data trimming and conversion

S4.1.1 For the obtained line-source thermal plume attenuation signal data of the groundwater, determine a depth range and depth interval of valid data based on a defined apex and end point, meanwhile, select appropriate temperature data recording frequency and determine a time interval for data recording based on research needs;

S4.1.2 Use the determined depth range to segment the original data, and select and obtain the required temperature data according to the determined time interval; assuming that X is a given two-dimensional line source thermal plume attenuation signal data of the groundwater, with a depth range L of [0, M], a time range T of [0, N], then the temperature data X is a two-dimensional array of shape N×M, $X=\{x_{i,j}\}$, $i \in \{1, 2, \ldots, N\}$, $j \in \{1, 2, \ldots, M\}$;

S4.1.3 Perform a transposition operation on the trimmed temperature data to obtain a two-dimensional array $X^T$ of shape M×N, $X^T=\{x_{i,j}\}$ $i \in \{1, 2, \ldots, M\}$, $j \in \{1, 2, \ldots, N\}$;

S4.2 Temperature data signal denoising

S4.2.1 Determine an appropriate cutoff frequency;

S4.2.2 Use a low-pass filter to perform low-pass filtering on the signal; for Butterworth filters, a relationship between amplitude and frequency of a n Butterworth low-pass filter is expressed by the following formula:

$$|H(j\omega)| = \frac{1}{\sqrt{1+\left(\frac{\omega}{\omega_C}\right)^{2n}}},$$

where $|H(j\omega)|$ is amplitude of frequency response; $\omega$ is angular frequency; $\omega_c$ is cutoff frequency, which is a frequency point at which the filter begins to significantly attenuate the output signal; n is the order of the filter;

Step S5: By monitoring and analyzing the temperature difference signal between the internal temperature and the external temperature of the composite heating optical cable in a single depth section of the borehole, fitting a groundwater velocity-depth curve in the borehole to obtain a distributed groundwater velocity data set.

According to some embodiments of the present disclosure, step S1 comprises:

analyzing physical parameters of the borehole and core, comprising lithology distribution, thermal conductivity, porosity, specific heat capacity and permeability;

setting and optimizing parameters of a distributed optical fiber temperature measurement host (1).

According to some embodiments of the present disclosure, the step of setting and optimizing parameters of a distributed optical fiber temperature measurement host (1) comprises:

setting a monitoring length and heating line position of a temperature measuring optical fiber, and calibrating optical fiber refractive index parameters through a first water bath temperature calibration unit (5) and a second water bath temperature calibration unit (6);

testing a monitoring temperature resolution and temperature accuracy of the distributed optical fiber temperature measurement host (1), and calibrating and optimizing optical fiber attenuation coefficient, temperature sensitivity coefficient and temperature compensation value of the distributed optical fiber temperature measurement host (1) through the first water bath temperature calibration unit (5) and the second water bath temperature calibration unit (6);

performing test in borehole groundwater, and setting maximum temperature, duration, and power of the heating based on expected temperature response and safety criteria.

According to some embodiments of the present disclosure, after the background temperature monitoring test, all collected temperature data are corrected to ensure that the temperature measurement results at different depths and locations are coordinated with each other, and a background temperature-depth profile is produced to provide basic data for subsequent active heating distributed temperature measurement experiments.

According to some embodiments of the present disclosure, after the line-source active heating distributed temperature measurement test, the data collected by a downhole temperature measurement unit and a surface temperature measurement unit are compared with the standard temperature data, the deviation is adjusted, and the temperature data in the heating stage and the temperature data in the cooling stage are analyzed.

According to some embodiments of the present disclosure, step S4 comprises:

trimming and conversing the line source thermal plume attenuation signal data of the groundwater;

denoising the distributed temperature data obtained from the test.

According to some embodiments of the present disclosure, when the composite heating optical cable is heated, the internal temperature measuring optical fiber monitors a temperature $T_1$ at a radius $R_1$, and the external reference optical fiber monitors a temperature $T_r$, the heat transfer in the fluid at an outer radius $R_2$ of the composite heating optical cable conforms to Newton's cooling law, the heat transfer process of the groundwater in the borehole is described as follows:

$$T_1 - T_r = \Delta T = \frac{q}{2\pi}\left(\frac{1}{hR_2} + \frac{1}{k_c}\ln\frac{R_2}{R_1}\right)$$

q is a heating power of the heat input source; h is a convection heat exchange coefficient; $k_c$ is a thermal conductivity coefficient of an insulating waterproof protective case; $R_1$ and $R_2$ represent radius.

According to some embodiments of the present disclosure, the convection heat exchange coefficient h is calculated by the following formula:

$$h = \frac{k_f}{L}Nu,$$

where $k_f$ is the thermal conductivity of groundwater, L is the borehole diameter, and Nu is the Nusselt number.

According to some embodiments of the present disclosure, the Nusselt number Nu is calculated by the following formula:

$$Nu = (Nu_F^n \pm Nu_N^n)^{1/n},$$

where $Nu_F$ is forced convection Nusselt number and $Nu_N$ is free convection Nusselt number; the value range of n is 3~4.

According to some embodiments of the present disclosure, the method adopts a line source active heating composite optical cable groundwater distributed optical fiber temperature measurement system.

The beneficial technical effects of the present disclosure are:

1. The current single-point flow velocity and direction detection technology requires the detection device/probe to be placed in the wellbore, and it can only detect the groundwater velocity at a certain local point at a time. If it is necessary to detect the groundwater velocity at different depths or layers, it must lift or lower the probe to the target layer. Therefore, the spatiotemporal continuity of the measured data is poor, and the disturbance to the groundwater is large during the detection process, which increases the error of the measurement result. The present disclosure adopts distributed optical fiber temperature measurement technology and active heating, composite optical cable, it can simultaneously and continuously and distributedly measure the vertical flow velocity of groundwater in the wellbore, greatly improving the efficiency and cost of groundwater flow velocity measurement 2. Many velocity testing methods, such as tracer dilution method, involve the introduction of substances that are not originally in the groundwater into the aquifer, which may cause environmental pollution. The present disclosure uses temperature signals to analyze groundwater velocity. Temperature is one of the properties of groundwater itself. Using temperature as a tracer to carry out velocity measurement will not cause environmental pollution, but also it is very easy to measure. In particular, after the introduction of DTS, high-precision, high temporal and spatial resolution and long-term continuous monitoring of groundwater temperature has been achieved, greatly improving the efficiency and accuracy of velocity measurement.

LIST OF REFERENCE NUMERALS

1 Distributed optical fiber temperature measurement host
2 Optical fiber Pigtail
3 Heating device controller
4 Cable
5. First water bath temperature calibration unit
6 Second water bath temperature calibration unit
7 Ground
8 Groundwater surface
9 Composite heating optical cable
11 Cable weight
12 Waterproof protective case
14 Load-bearing cable
15 Wire set
16 Temperature probe data transmission line
17 Filler
18 Rigid support frame;
19 Reference optical fiber.

DETAILED DESCRIPTION OF EMBODIMENTS

Exemplary embodiments of the present disclosure are described in detail below in conjunction with the accompanying drawings, wherein the same or similar reference numerals represent the same or similar elements. In addition, in the detailed description below, for ease of explanation, many specific details are set forth to provide a comprehensive understanding of the disclosed embodiments. However, it is apparent that one or more embodiments may also be implemented without these specific details. In other cases, known structures and devices are embodied in a schematic manner to simplify the accompanying drawings.

The present disclosure relates to hydrogeological exploration technology in geophysics, and utilizes distributed temperature measurement optical fiber technology to continuously measure the spatiotemporal changes of groundwater temperature through active heating composite optical cable, and analyze and estimate the distributed vertical flow velocity of groundwater. The present disclosure solves the problem that the existing groundwater flow velocity measurement technology cannot simultaneously conduct continuous and distributed measurements, and it specifically includes groundwater distributed optical fiber temperature measurement technology based on line-source active heating composite optical cable, and groundwater line source thermal plume attenuation data processing technology and distributed groundwater flow velocity estimation technology.

Groundwater flow rate is positively correlated with groundwater velocity. Groundwater velocity is a key parameter in hydrogeological research and an important scientific parameter for groundwater resource development, pollution prevention and control, underground engineering construction, and underground mineral resource exploitation. Current groundwater velocity measurement techniques such as point source tracer dilution method, flow meter, and optical flow meter can only detect velocity information at a certain point or section at a time. The spatiotemporal continuity of the measured data is poor, and the groundwater is greatly disturbed during the detection process, increasing the error of the measurement results.

During the groundwater seepage process, the temperature field and the seepage field interact and influence each other. There is a close coupling relationship between the two, so the flow of groundwater is bound to cause temperature field disturbance. The groundwater flow rate/velocity can be calculated by decoupling the seepage field and the temperature field based on the spatiotemporal variation of groundwater temperature. In recent years, distributed optical fiber temperature sensors (DTS) have achieved high-precision, high spatiotemporal resolution, and strong continuity of temperature monitoring. Due to its convenient measurement and cost-effectiveness, it has been widely used in fire detection, power grid monitoring, pipeline monitoring, oil and gas development and other fields.

Temperature signal is one of the properties of groundwater itself. Using temperature as a tracer to carry out flow velocity measurement will not cause environmental pollution, but also it is very easy to measure. In particular, after the introduction of DTS, high-precision, high-temporal and spatial resolution and long-term continuous monitoring of groundwater temperature has been achieved. However, natural groundwater temperature measurement cannot estimate groundwater flow velocity. The present disclosure uses temperature as a tracer and uses line-source heating by electric heating to provide a "thermal tracer", which greatly increases the temperature signal amplitude, thereby using DTS to monitor the temperature signal change process in the wellbore to calculate the groundwater flow velocity. This method is simple, convenient, economical, and pollution-free. It can simultaneously perform distributed measurement of groundwater flow velocity in the same wellbore in one measurement, reducing the disturbance attenuation of a single-point flow meter, and the calculated groundwater flow velocity has a wide range, which has a good application prospect.

The line source, active heating, distributed optical fiber method for measuring multi-layer groundwater flow rate and/or velocity of the present disclosure will be described in detail below in conjunction with specific embodiments.

Figure 1:
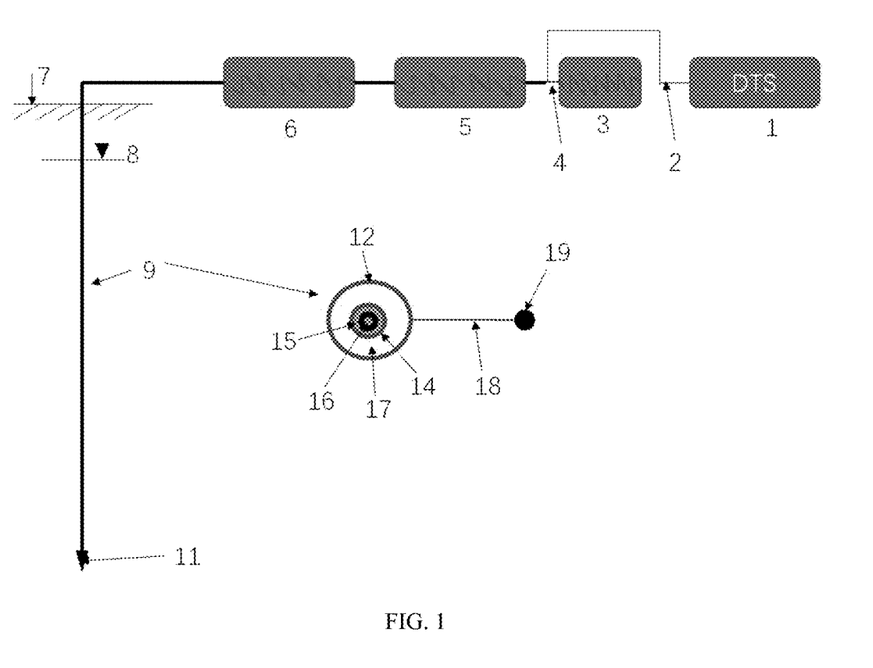
FIG. 1 is a schematic diagram of a groundwater distributed optical fiber temperature measurement system with a line-source active heating, composite optical cable according to an embodiment of the present disclosure.

(1) Line-Source Active Heating Composite Optical Cable Groundwater Distributed Optical Fiber Temperature Measurement System or Device The method for measuring groundwater flow velocity of the present disclosure adopts this line-source active heating composite optical cable groundwater distributed optical fiber temperature measurement system or device, and the system or device is introduced below. The system or device mainly includes a distributed optical fiber temperature measurement host 1, a heating device controller 3, a cable 4, a first water bath temperature calibration unit 5, a second water bath temperature calibration unit 6, a composite heating optical cable 9, and a cable weight 11.

Distributed optical fiber temperature measurement host 1 is a high-precision distributed optical fiber temperature measurement host. In order to accurately obtain flow velocity data, the basic parameters of the distributed optical fiber temperature measurement host (DTS) are required to be as follows: sensing distance of more than 1 km, temperature resolution equal to or better than 0.05° C., sampling interval equal to or better than 0.5 m, spatial resolution better than 1 m, temperature measurement range of −30-100° C., and temperature measurement accuracy of ±0.15° C. or better.

The composite heating optical cable 9 extends into the groundwater surface 8 below the ground 7 (wellhead). The composite heating optical cable 9 is composed of a waterproof protective case 12, a load-bearing cable 14, a wire set 15, a temperature probe data transmission line 16, a filler 17, a rigid support frame 18 and a reference optical fiber 19. The load-bearing cable 14, the wire set 15, the temperature probe data transmission line 16 and the filler 17 are arranged in the waterproof protective case 12. The single-loop wire of the wire set 15 below the groundwater surface adopts an electric heating wire, and the power is adjusted according to different test environments. The other parts are electric wires. The temperature probe data transmission line 16 is a thermocouple temperature probe data transmission line in the heater, which transmits the temperature data of the temperature probe back to the heating device controller 3. The filler 17 is an insulating filler, which is arranged in the waterproof protective case 12 and around each cable. A cable weight 11 is arranged at the lower end of the composite heating optical cable 9. The waterproof protective case 12 is fixed by the rigid support frame 18.

Above the ground 7, the composite heating optical cable 9 is provided with a first water bath temperature calibration unit 5 and a second water bath temperature calibration unit. The first water bath temperature calibration unit 5 is a high-temperature water bath temperature calibration unit, which provides correction for the optical fiber temperature in the water bath unit by providing a constant temperature of more than 20 degrees. The second water bath temperature calibration unit 6 is a low-temperature water bath temperature calibration unit, which provides correction for the optical fiber temperature in the water bath unit by providing a constant temperature of 0 degrees. The composite heating optical cable 9 is connected to the heating device controller 3 through the cable 4. The heating device controller 3 is an intelligent controller, which has two functions. One is to control the start and stop of the line source heater; the second is to intelligently control the heating temperature through the heating temperature obtained from the temperature probe data transmission line to ensure that the heating temperature does not exceed 70 degrees. The composite heating optical cable 9 is connected to the distributed optical fiber temperature measurement host 1 (DTS) through the optical fiber pigtail 2.

(2) Line-Source Active Heating Distributed Optical Fiber Temperature Measurement Test Technology S1 Field test parameter setting and optimization S1.1 On-site drilling data analysis S1.1.1 Analysis of drilling core data. Before temperature monitoring, it is necessary to first conduct a detailed analysis of the basic physical parameters of the drilling and core, including:

Lithology distribution: Identify rock types and sequence structures.

Thermal conductivity: Determine the ability of different rocks to conduct heat, which is important for assessing groundwater heat transfer.

Porosity: Calculate the volume ratio of voids in rock. Porosity directly affects the water storage capacity and permeability of rock.

Specific Heat Capacity: A measure of a rock's heat capacity per unit mass, which is a key parameter in assessing its thermal responsiveness.

Permeability coefficient: determines the permeability of rock to fluid and affects the efficiency of thermal fluid propagation in rock.

S1.2 DTS parameter setting and optimization

S1.2.1 Optimize the monitoring length and heating line position of the temperature measuring optical fiber. According to the core data analysis results and the actual drilling geological conditions, set the appropriate total length of the optical fiber to ensure coverage of the key monitoring area. Ensure that the heating section of the line source is located at the fracture, broken zone or other key sections of concern in the borehole, so that it is located at a location with large changes in heat conduction and heat capacity, so as to accurately capture temperature changes. Calibrate the optical fiber refractive index parameter through the high-temperature water bath temperature calibration unit, the low-temperature water bath temperature calibration unit and other temperature calibration/correction points.

S1.2.2 Temperature resolution and temperature accuracy test of temperature measurement fiber DTS monitoring. Temperature resolution: Test the temperature resolution of the DTS system under different conditions to ensure that it can capture subtle temperature changes. Temperature accuracy: Calibrate the DTS system through a standard temperature source to verify its temperature accuracy during the actual monitoring process and ensure data reliability. Calibrate and optimize DTS related parameters such as fiber attenuation coefficient, temperature sensitivity coefficient, temperature compensation value, etc. through a high-temperature water bath temperature calibration unit, a low-temperature water bath temperature calibration unit, and other temperature calibration points.

S1.2.3 Optimization of heating test parameters. Tests are conducted in borehole groundwater, and the maximum temperature and duration of heating as well as the heating power are set based on the expected temperature response and safety standards.

S2 Background temperature monitoring test

S2.1 DTS parameter optimization

S2.1.1 Test circuit design and on-site equipment testing, including circuit connection debugging, power supply equipment (generator, battery, etc.) power testing, etc. Ensure that all equipment is connected correctly, check the connectivity and stability of power supply equipment (such as generator, battery), and perform power testing to verify that they can provide continuous and stable power supply.

S2.1.2 DTS optical fiber on-site layout and testing. Repeat the DTS parameter setting and optimization of S1.2, check and debug the optical fiber temperature measurement accuracy and parameters, and calibrate the DTS temperature measurement system, including the calibration of the length of the optical fiber to be monitored underground, the calibration of the surface temperature calibration length, and the calibration of the position of the underground temperature probe.

S2.2 Formal background temperature measurement test

S2.2.1 The first round of temperature measurement test: Start DTS to monitor the borehole background temperature-depth profile. The monitoring time should be more than 24 hours.

S2.2.2 Perform data quality check of the first round of temperature measurement test to ensure data integrity and quality.

S2.2.3 Repeat steps S2.2.1 and S2.2.2 and perform 2-3 background temperature measurements to grasp the overall temperature change characteristics.

S2.3 Post-experiment processing and data integration analysis

S2.3.1 Temperature data calibration between downhole temperature measuring unit and surface temperature measuring unit. All collected temperature data shall be calibrated to ensure that the temperature measurement results at different depths and locations are coordinated with each other.

S2.3.2 Wellbore temperature-depth monitoring profile analysis: Integrate and analyze all monitoring data to produce a temperature-depth profile diagram to provide basic data for subsequent active heating tests.

S3 A-DTS (Active-distributed temperature sensing) test based on line heating

S3.1 Preliminary test

S3.1.1 Repeat S2.1 to design the test circuit and conduct on-site equipment testing, including circuit connection debugging, power test of power supply equipment (generator, battery, etc.), DTS optical fiber on-site layout and testing, including calibration of downhole optical fiber length to be monitored, calibration of surface temperature calibration length, calibration of downhole temperature calibration unit position, inspection and debugging of optical fiber temperature measurement accuracy and parameters, and calibration of DTS temperature measurement system.

S3.1.2 Downhole line heating maximum heating power test, maximum heating temperature test, optimization and adjustment of heating parameter settings S3.2 Formal temperature measurement test S3.2.1 Background temperature monitoring, turn on DTS to start monitoring, and select the appropriate background monitoring time based on the background temperature measurement results in S2.3, it should generally be greater than 6 hours.

S3.2.2 The first round of heating test: Turn on the intelligent controller of the heating device (heating device controller), and according to the results of S3.1.2, turn on the heating cable for a suitable time, so that the temperature of the groundwater monitoring line rises by several degrees. Then turn off the heater and stop DTS monitoring when the temperature of the monitoring line returns to the background temperature.

S3.2.3 Data quality check of DTS temperature measurement data in the first round of temperature measurement test. Check that the optical fiber data in the background temperature measurement stage, heating stage and cooling stage are complete and reliable in quality.

S3.2.4 Repeat S3.2.1, S3.2.2 and S3.2.3 and complete 2-3 heating tests.

S3.3 Post-experiment processing and data integration analysis

S3.3.1 Temperature data calibration of downhole temperature measuring unit and surface temperature measuring unit. Compare the data collected by downhole temperature measuring unit and surface temperature measuring unit with standard temperature data, adjust the deviation, and ensure that all temperature measurement data meet high accuracy and high reliability standards. The purpose of this step is to eliminate temperature measurement deviation caused by environmental factors, equipment errors or operating errors, and provide a reliable data for subsequent in-depth analysis.

S3.3.2 Analysis of downhole temperature-depth profiles during the heating and cooling phases. Analyze the temperature data during the heating phase, paying special attention to the change in temperature with depth, and the speed and intensity of the groundwater response to heating at different depths of the borehole. This can help identify differences in thermal conductivity and potential heterogeneity in the borehole. Cooling phase analysis: After heating is stopped, monitor how the temperature returns to its initial state over time and depth. Data analysis at this stage is critical for estimating groundwater flow velocity/rate.

(3) Groundwater Line Source Heat Plume Attenuation Data Processing and Groundwater Flow Velocity Estimation Technology S4 Denoising Method for Groundwater Line Source Thermal Plume Attenuation Signal Data S4.1 Original signal data trimming and conversion S4.1.1 For the line source heat plume attenuation signal data of the groundwater obtained in (2), first determine the depth range and depth interval of the valid data based on the defined apex and end point, and at the same time select an appropriate temperature data recording frequency based on research requirements, that is, determine the time interval for data recording.

S4.1.2 Use the defined depth range to segment the raw/original data and select the required temperature data according to the determined time interval. Assume that X is a given two-dimensional line source heat/thermal plume attenuation signal data of the groundwater, the depth L range is [0, M], the time range T is [0, N], so the temperature data X is a two-dimensional array of shape N×M, $X=\{x_{i,j}\}$, $i \in \{1, 2, \ldots, N\}$, $j \in \{1, 2, \ldots, M\}$.

S4.1.3 Transpose the trimmed temperature data to obtain a two-dimensional array $X^T$ of shape M×N, $X^T=\{x_{i,j}\}$, $i \in \{1, 2, \ldots, M\}$, $j \in \{1, 2, \ldots, N\}$.

S4.2 Temperature data signal denoising

The distributed temperature data obtained from the experiment is subjected to noise removal. In order to streamline the data processing process and improve the efficiency of practical applications, the digital signal denoising method in this step is carried out using the scipy.signal module based on the Python language. The scipy.signal library is a professional tool for signal processing that supports many standard and commonly used signal processing techniques to help users convert and analyze time series data, audio signals, electrical signals or other physical signals. In addition to the above tools, the Signal Processing Toolbox in MATLAB is also a high-level language and interactive environment widely used in the field of signal processing. It also provides a wide range of preset functions and tools for designing filters, spectrum analysis, and transform analysis. Other signal denoising methods can also be used for this step.

S4.2.1 Determine the appropriate cut-off frequency

S4.2.2 Use a low-pass filter to perform low-pass filtering on the signal. The low-pass filter can retain low-frequency signals, that is, large-scale fluctuations in the data, while filtering out high-frequency signals, that is, fast and small-scale fluctuations in the data. Common low-pass filtering methods include moving average filters, exponential smoothing filters, Butterworth low-pass filters, and Chebyshev filters. Butterworth filter is a type of electronic filter, and it is also called a maximum flat filter. Its characteristics are that the frequency response curve in the passband is maximally flat, without ripples, and gradually decreases to zero in the stopband. On the Bode plot of the logarithm of the amplitude against the diagonal frequency, starting from a certain boundary angular frequency, the amplitude gradually decreases with the increase of the angular frequency and tends to negative infinity. For the Butterworth filter, the relationship between the amplitude and frequency of the n Butterworth low-pass filter can be expressed by the following formula:

$$|H(j\omega)| = \frac{1}{\sqrt{1+\left(\frac{\omega}{\omega_C}\right)^{2n}}}$$

$|H(j\omega)|$ is the amplitude of the frequency response; $\omega$ is the angular frequency; $\omega_c$ is the cutoff frequency, that is, the frequency point at which the filter begins to significantly attenuate the output signal; n is the order of the filter. The higher the order, the faster the filter attenuates near the cutoff frequency.

Next, we use the low-pass filter function butter in the scipy.signal module to design a Butterworth low-pass filter, and then pass it through the filtfilt function in the module to avoid introducing phase delay. The key parameters of the scipy.signal.butter function include N, Wn and btype. The N (int) parameter is the order of the filter, which determines the speed of the filter attenuation rate. The higher the order, the faster the filter attenuates near the cutoff frequency, but it may introduce more phase distortion. The Wn (array_like) parameter is an array of length 2, indicating the range of the cutoff frequency. The btype (str) defines the type of filter as a low-pass filter. The filter coefficients returned by the butter function are used in the filtfilt function. The designed filter is used to low-pass filter each column of temperature data along the column direction, smoothing the small fluctuations in the temperature data that changes with depth at different time intervals, retaining the real and effective temperature change signal.

S5 Flow velocity calculation

Figure 2:
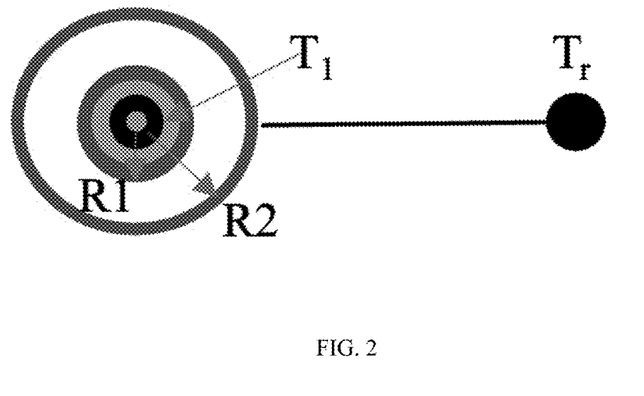
FIG. 2 shows a heat-fluid coupling conceptual model for conducting a line heating test based on a composite heating optical cable.
Figure 3:
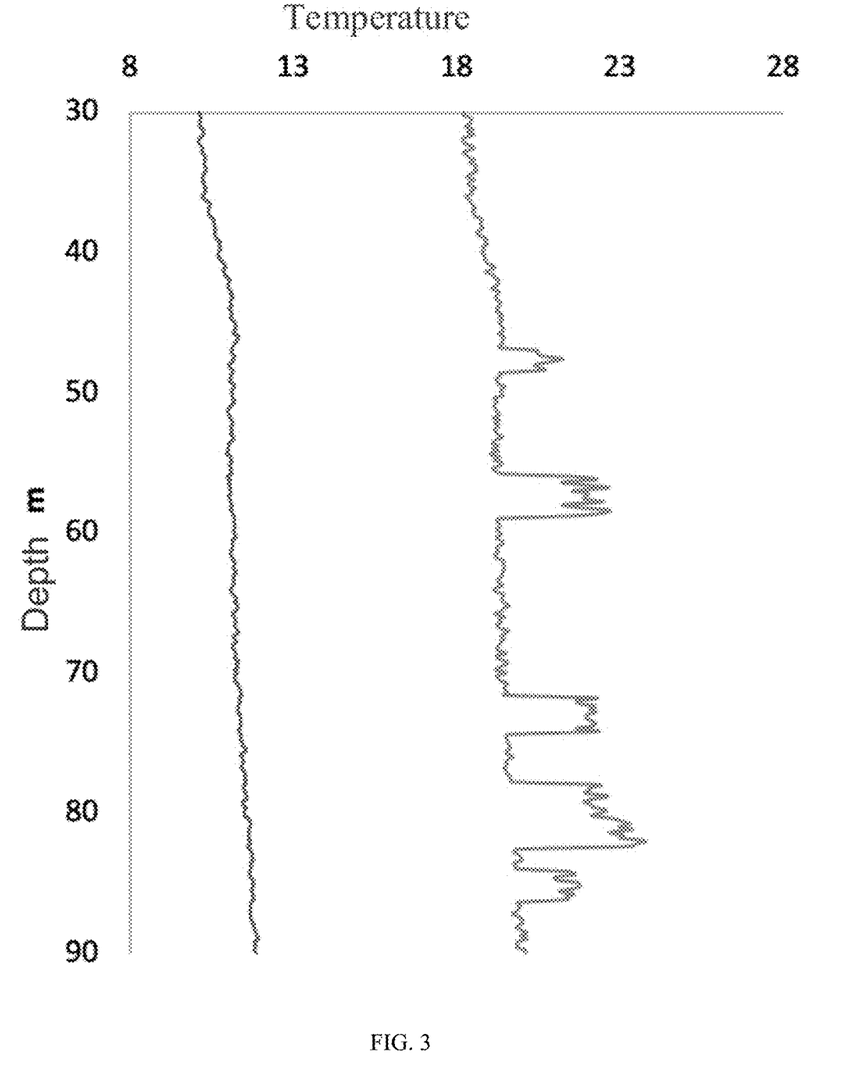
FIG. 3 shows temperature measurement data according to an embodiment of the present invention, wherein the left side shows the reference optical fiber temperature and the right side shows the composite heating optical cable temperature.
Figure 4:
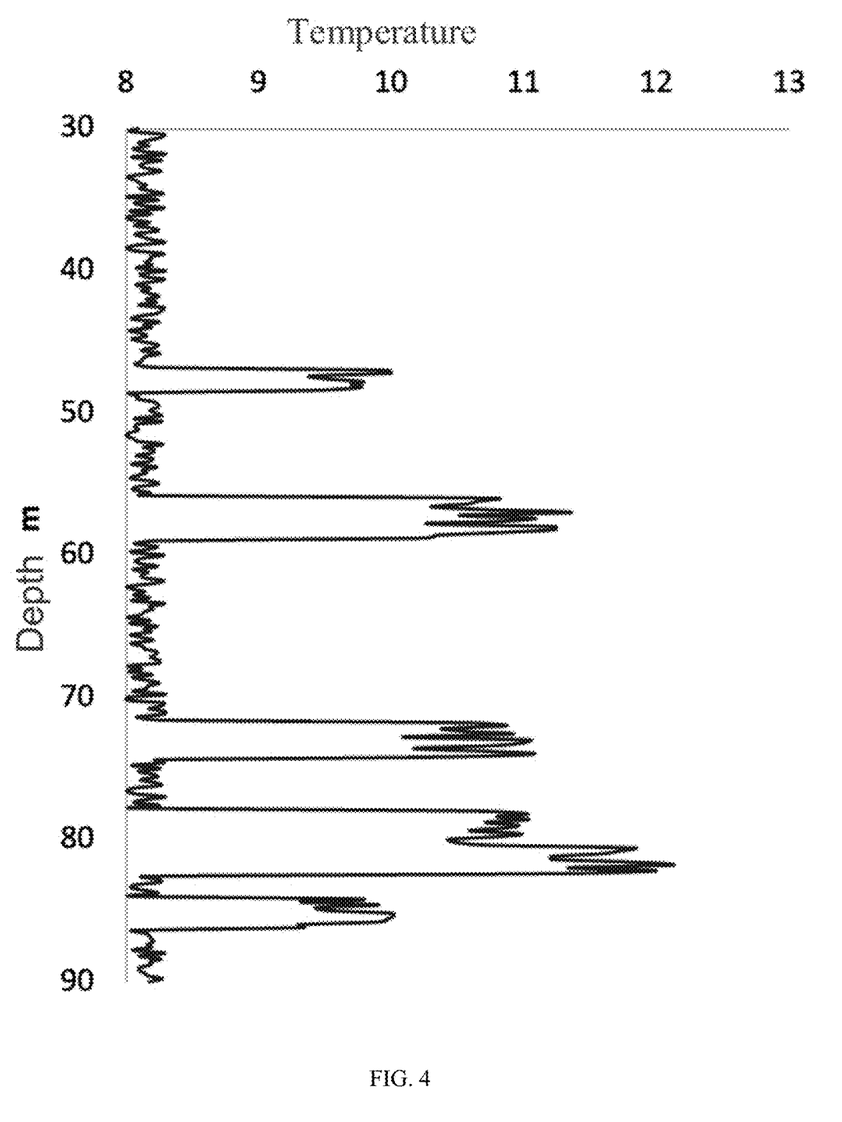
FIG. 4 shows temperature rise data at different depths according to an embodiment of the present invention.
Figure 5:
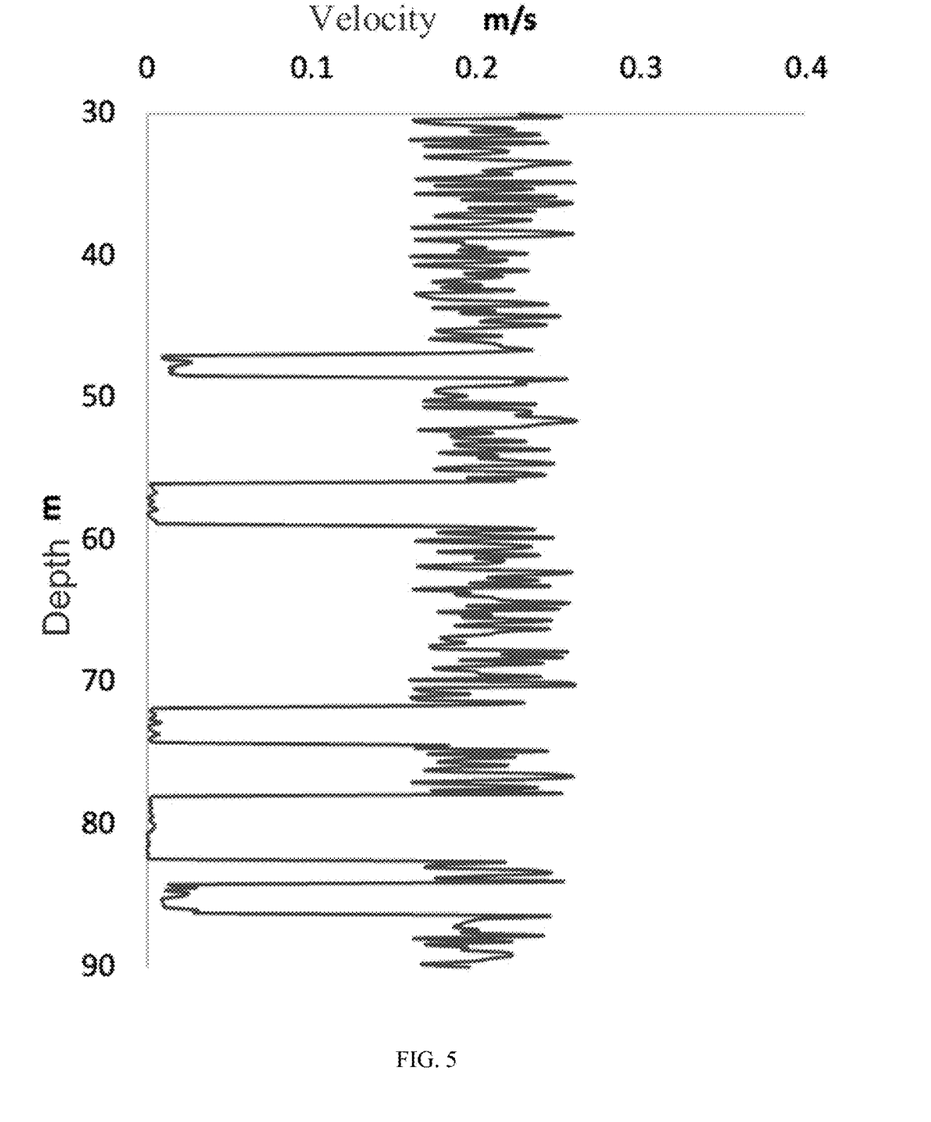
FIG. 5 shows the calculated distributed flow velocities.

S5.1 Relationship between temperature difference and heat source in groundwater heat migration process FIG. 2 is a heat-flow coupling conceptual model for conducting a line heating test based on a composite heating optical cable. The internal line heating source of the optical cable in the test is an electric heating wire, and the internal temperature measurement optical fiber simultaneously monitors the temperature; there is also a reference optical fiber outside the optical cable to monitor the temperature of the groundwater in the borehole. By monitoring and analyzing the temperature difference signal ΔT in a single depth section of the borehole, the groundwater velocity-depth curve in the borehole is fitted and a distributed groundwater velocity data set is obtained.

The composite heating cable is heated, the internal temperature measuring optical fiber can monitor the temperature $T_1$ at $R_1$, and the external reference optical fiber can monitor the temperature $T_r$. There is temperature conduction in the insulating filler and waterproof protective case outside the heating source, that is, the heat conduction process of ($R_2$–$R_1$) needs to be considered. The heat transfer in the fluid at $R_2$ outside the composite heating cable conforms to Newton's cooling law, so the heat transfer process in the borehole groundwater can be described as:

$$T_1 - T_\Gamma = \Delta T = \frac{q}{2\pi}\left(\frac{1}{hR_2} + \frac{1}{k_c}\ln\frac{R_2}{R_1}\right)$$

q is heating power (W/m) of heat input source, h is convective heat exchange coefficient (W/m$_2$K); $k_c$ is thermal conductivity coefficient of the insulating waterproof protective cover (W/mK); $R_1$ and $R_2$ represent the radius.

S5.2 Determine the Convective Heat Transfer/Exchange Coefficient

The convective heat transfer coefficient (convective heat exchange coefficient) h can be calculated by the following formula:

$$h = \frac{k_f}{L}Nu$$

Where, $k_f$ is the thermal conductivity coefficient of groundwater (W/mK), L is the borehole diameter, and Nu is the Nusselt number, the ratio of the thermal convection intensity to the thermal conduction intensity at the fluid boundary.

S5.3 Determine the Nusselt number (Nu)

When the groundwater velocity is low, the free convection process caused by the buoyancy generated by the temperature and density changes inside the fluid cannot be ignored. Therefore, the Nusselt number in the above formula is the coupling of forced convection and free convection processes:

$$Nu = (Nu_F^n \pm Nu_N^n)^{1/n}$$

In the above formula, $Nu_F$ is the forced convection Nusselt number and $Nu_N$ is the free convection Nusselt number; n usually ranges from 3 to 4.

S5.3.1 Calculation of the Nusselt number $Nu_F$ for forced convection

According to the experimental conditions, the forced convection Nusselt number ($Nu_F$) can be calculated based on the Reynolds number (Re) and Prandtl number (Pr) of the flow:

$$Nu_F = 0.664 Re^{1/2} Pr^{1/3}$$

S5.3.2 Calculation of Reynolds number Re and Prandtl Numbers Pr

The Reynolds number Re can be calculated based on the groundwater velocity v (m/s), density ρ (kg/m$^3$), dynamic viscosity μ (N·s/m$^2$), and borehole diameter L(m). The Prandtl number (Pr) can be calculated based on the fluid specific heat capacity $C_{pw}$(J/kg·K), thermal conductivity $k_w$(W/mK), and dynamic viscosity μ(N·s/m$^2$).

$$Re = \frac{\rho v L}{\mu}$$

$$Pr = \frac{\mu C_{pw}}{k_w}$$

S5.3.3 Calculation of the Nusselt Number $Nu_N$ for Free Convection

The free convection Nusselt number $Nu_N$ is also determined by the Reynolds number and the Prandtl number:

$$Nu_N^{1/2} = 0.825 + \frac{0.387 Re^{1/6}}{\left[1 + \left(\frac{0.437}{Pr^{9/16}}\right)\right]^{8/27}}$$

S5.4 Iterative calculation to obtain groundwater flow velocity

Based on the above formula, the optimal expression is selected for $Nu_N$ and it is fitted with the measured temperature difference as the target. By adjusting the groundwater flow velocity v until the calculated value ΔT is consistent with the measured value, the groundwater flow velocity v of the analytical section in the borehole can be calculated. Calculating the groundwater flow velocity section by section will obtain the groundwater flow velocity profile distributed vertically along the borehole.

The beneficial technical effects of the present disclosure are:

1. The current single-point flow velocity and direction detection technology requires the detection device/probe to be placed in the wellbore, and it can only detect the groundwater velocity at a certain local point at a time. If it is necessary to detect the groundwater velocity at different depths or layers, it must lift or lower the probe to the target layer. Therefore, the spatiotemporal continuity of the measured data is poor, and the disturbance to the groundwater is large during the detection process, which increases the error of the measurement result. The present disclosure adopts distributed optical fiber temperature measurement technology and active heating, composite optical cable, it can simultaneously and continuously and distributedly measure the vertical flow velocity of groundwater in the wellbore, greatly improving the efficiency and cost of groundwater flow velocity measurement.

2. Many velocity testing methods, such as tracer dilution method, involve the introduction of substances that are not originally in the groundwater into the aquifer, which may cause environmental pollution. The present disclosure uses temperature signals to analyze groundwater velocity. Temperature is one of the properties of groundwater itself. Using temperature as a tracer to carry out velocity measurement will not cause environmental pollution, but also it is very easy to measure. In particular, after the introduction of DTS, high-precision, high temporal and spatial resolution and long-term continuous monitoring of groundwater temperature has been achieved, greatly improving the efficiency and accuracy of velocity measurement.

Although the embodiments of the present disclosure have been shown and described, it will be appreciated by those skilled in the art that changes may be made to these embodiments without departing from the principles and spirit of the present disclosure. The scope of application of the present disclosure is defined by the appended claims and their equivalents.

What is claimed is:

1. A method for measuring flow velocity distribution of groundwater using distributed optical fiber with active heating, comprising:

Step S1: Setting and optimizing field test parameters comprising:

Step S2: Conducting a background temperature monitoring test, comprising performing multiple rounds of temperature measurement tests; monitoring background temperature of a borehole along a depth profile in each round of temperature measurement tests, with a monitoring time of more than 24 hours; and performing a quality check on the temperature measurement test data after each round of temperature measurement tests;

S2.1 Optimizing distributed temperature sensing (DTS) parameters comprising:

S2.1.1 Testing circuit design and on-site equipment testing comprising:

S2.1.2 Laying out DTS optical fiber on-site and testing; comprising checking and debugging optical fiber temperature measurement accuracy and parameters, and calibrating a DTS temperature measurement system, including calibrating the length of the optical fiber to be monitored underground, surface temperature calibration duration, and position of the underground temperature probe;

S2.2 Conducting a formal background temperature measurement test comprising:

S2.2.1 Conducting a first round of temperature measurement tests comprising: Starting DTS to monitor the borehole background temperature-depth profile; wherein the monitoring time is more than 24 hours;

S2.2.2 Performing a Data quality check of the first round of temperature measurement tests to ensure data integrity and quality;

S2.2.3 Repeating steps S2.2.1 and S2.2.2 to perform background temperature measurement 2-3 times to grasp the overall temperature change characteristics;

S2.3 Conducting post-experiment processing and data integration analysis comprising:

S2.3.1 of Calibrating temperature data between a downhole temperature measuring unit and a surface temperature measuring unit comprising: calibrating all collected temperature data to ensure that the temperature measurement results at different depths and locations are coordinated with each other;

S2.3.2 Conducting a wellbore temperature-depth monitoring profile analysis comprising: integrating and analyzing all monitoring data, to produce a temperature-depth profile diagram, and to provide basic data for subsequent active heating tests comprising:

Step S3: Performing a line-source active heating distributed temperature measurement test, comprising performing multiple rounds of heating tests; comprising: in each round of heating tests, controlling a heating device controller to turn on composite heating optical cable for a predetermined time, so that the temperature of groundwater monitoring line rises to a predetermined temperature value, then stopping heating; and stopping monitoring when the temperature of the groundwater monitoring line returns to the background temperature; and performing a quality check on the temperature measurement test data after each round of heating tests;

S3.1 Conducting a preliminary test comprising:
S3.1.1 Repeating the steps in S2.1.2 in addition to circuit connection debugging, and power testing of power supply equipment
S3.1.2 Conducting a downhole line heating maximum heating power test, a maximum heating temperature test, and optimization and adjustment of heating parameter settings comprising:
S3.2 Conducting a formal temperature measurement test comprising:
S3.2.1 Conducting background temperature monitoring, comprising turning on DTS to start monitoring, and selecting the background monitoring duration according to the background temperature measurement results in S2.3;
S3.2.2 Conducting a first round of heating tests comprising: Turning on the intelligent controller of the heating device, and according to the results of S3.1.2, turning on the heating cable for a suitable time to make the temperature of the groundwater monitoring line rise by a certain degree, then turning off the heating cable and stopping DTS monitoring when the temperature of the monitoring line returns to the background temperature;
S3.2.3 Conducting a quality check of DTS temperature measurement data in the first round of a temperature measurement test;
S3.2.4 Repeating S3.2.1, S3.2.2 and S3.2.3 and completing 2-3 heating tests;
S3.3 Conducting post-experiment processing and data integration analysis comprising:
S3.3.1 Calibrating temperature data of the downhole temperature measuring unit and the surface temperature measuring unit comprising: comparing the data collected by the downhole temperature measuring unit and surface temperature measuring unit with standard temperature data, adjusting the deviation, and ensuring that all temperature measurement data meet high accuracy and high reliability standards;
S3.3.2 Conducting analysis of downhole temperature-depth profiles during the heating and cooling phases comprising: analyzing temperature data during the heating phase, focusing on changes in temperature with depth, and the speed and intensity of groundwater response to heating in boreholes of different depths;
Step S4: Denoising thermal plume attenuation signal data of the groundwater obtained in Step 3;
S4.1 Conducting original signal data trimming and conversion comprising:
S4.1.1 For the obtained line-source thermal plume attenuation signal data of the groundwater, determine a depth range and depth interval a temperature data recording frequency and a time interval for data recording;
S4.1.2 Use the determined depth range to segment the original data, and select and obtain the required temperature data according to the determined time interval; such that X is a given two-dimensional line source thermal plume attenuation signal data of the groundwater, with a depth range L of [0, M], a time range T of [0, N], then the temperature data X is a two-dimensional array of shape N×M, X={$x_{i,j}$}, i∈{1, 2, ..., N}; j∈{1, 2, ..., M};
S4.1.3 Perform a transposition operation on the trimmed temperature data to obtain a two-dimensional array $X^T$ of shape M×N, $X^T$={$x_{i,j}$}, i∈{1, 2, ..., M}; j∈{1, 2, ..., N};
S4.2 Conducting temperature data signal denoising comprising:
S4.2.1 Determining a cutoff frequency;
S4.2.2 Using a Butterworth low-pass filter to perform low-pass filtering on the signal; wherein for the Butterworth filter, a relationship between amplitude and frequency of an n Butterworth low-pass filter is expressed by the following formula:

$$|H(j\omega)| = \frac{1}{\sqrt{1+\left(\frac{\omega}{\omega_C}\right)^{2n}}},$$

where |H(jω)| is amplitude of frequency response; ω is angular frequency; $\omega_c$ is cutoff frequency, which is a frequency point at which the filter begins to significantly attenuate the output signal; and n is the order of the filter;
Step S5: Fitting a groundwater velocity-depth curve in the borehole to obtain a distributed groundwater velocity data set by monitoring and analyzing the temperature difference signal between the internal temperature and the external temperature of the composite heating optical cable in a single depth section of the borehole.

2. The method according to claim 1, wherein step S1 comprises:
analyzing physical parameters of the borehole and core, comprising lithology distribution, thermal conductivity, porosity, specific heat capacity and permeability;
setting and optimizing parameters of a distributed optical fiber temperature measurement host (1).

3. The method according to claim 2, wherein the step of setting and optimizing parameters of a distributed optical fiber temperature measurement host (1) comprises:
setting a monitoring length and heating line position of a temperature measuring optical fiber, and calibrating optical fiber refractive index parameters through a first water bath temperature calibration unit (5) and a second water bath temperature calibration unit (6);
testing a monitoring temperature resolution and temperature accuracy of the distributed optical fiber temperature measurement host (1), and calibrating and optimizing optical fiber attenuation coefficient, temperature sensitivity coefficient and temperature compensation value of the distributed optical fiber temperature measurement host (1) through the first water bath temperature calibration unit (5) and the second water bath temperature calibration unit (6);
performing tests in borehole groundwater, and setting maximum temperature, duration, and power of the heating based on expected temperature response and safety criteria.

4. The method according to claim 1, wherein,
after the background temperature monitoring test, all collected temperature data are corrected to ensure that the temperature measurement results at different depths and locations are coordinated with each other, and a background temperature-depth profile is produced to provide basic data for subsequent active heating distributed temperature measurement experiments.

5. The method according to claim 1, wherein,
after the line-source active heating distributed temperature measurement test, data collected by a downhole temperature measurement unit and a surface temperature measurement unit are compared with the standard temperature data, the deviation is adjusted, and temperature data in a heating stage and temperature data in a cooling stage are analyzed.

6. The method according to claim 1, wherein step S4 comprises:
trimming and conversing the line source thermal plume attenuation signal data of the groundwater;
denoising the distributed temperature data obtained from the test.

7. The method according to claim 1, wherein
when the composite heating optical cable is heated, the internal temperature measuring optical fiber monitors a temperature $T_1$ at a radius $R_1$, and the external reference optical fiber monitors a temperature $T_f$, heat transfer in the fluid at an outer radius $R_2$ of the composite heating optical cable conforms to Newton's cooling law, and the heat transfer process of the groundwater in the borehole is described as follows:

$$T_1 - T_f = \Delta T = \frac{q}{2\pi}\left(\frac{1}{hR_2} + \frac{1}{k_c}\ln\frac{R_2}{R_1}\right)$$

wherein q is a heating power of the heat input source; h is a convection heat exchange coefficient; $k_e$ is a thermal conductivity coefficient of an insulating waterproof protective case; $R_1$ and $R_2$ represent radius.

8. The method according to claim 7, wherein
the convection heat exchange coefficient h is calculated by the following formula:
$h = K_f L\, Nu,$
where $k_f$ is the thermal conductivity of groundwater, L is the borehole diameter, and Nu is the Nusselt number.

9. The method according to claim 8, wherein, the Nusselt number Nu is calculated by the following formula:

$$h = \frac{k_f}{L}Nu,$$

where $Nu_F$ is forced convection Nusselt number and $Nu_N$ is free convection Nusselt number; the value range of n is 3~4.

10. The method according to claim 1, wherein,
the method utilizes a line source active heating composite optical cable groundwater distributed optical fiber temperature measurement system.

* * * * *